United States Patent
Ding et al.

(10) Patent No.: US 10,481,718 B2
(45) Date of Patent: Nov. 19, 2019

(54) TOUCH CONTROL METHOD FOR TOUCH PANEL, TOUCH PANEL, ACTIVE STYLUS FOR TOUCH PANEL, AND TOUCH DISPLAY APPARATUS INCLUDING TOUCH PANEL

(71) Applicant: BOE TECHNOLOGY GROUP CO., LTD., Beijing (CN)

(72) Inventors: Xiaoliang Ding, Beijing (CN); Xue Dong, Beijing (CN); Haisheng Wang, Beijing (CN); Yingming Liu, Beijing (CN); Wei Liu, Beijing (CN); Pengpeng Wang, Beijing (CN); Yanling Han, Beijing (CN); Rui Xu, Beijing (CN); Changfeng Li, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 63 days.

(21) Appl. No.: 15/573,897

(22) PCT Filed: Apr. 1, 2017

(86) PCT No.: PCT/CN2017/079337
§ 371 (c)(1),
(2) Date: Nov. 14, 2017

(87) PCT Pub. No.: WO2018/054032
PCT Pub. Date: Mar. 29, 2018

(65) Prior Publication Data
US 2018/0348938 A1    Dec. 6, 2018

(30) Foreign Application Priority Data

Sep. 22, 2016    (CN) .......................... 2016 1 0843299

(51) Int. Cl.
*G06F 3/041* (2006.01)
*G06F 3/0354* (2013.01)

(52) U.S. Cl.
CPC ........ *G06F 3/0414* (2013.01); *G06F 3/03545* (2013.01); *G06F 3/0416* (2013.01)

(58) Field of Classification Search
CPC .. G06F 3/03545; G06F 3/0414; G06F 3/0416; G06F 3/0354; G06F 2203/04104
See application file for complete search history.

(56) References Cited

U.S. PATENT DOCUMENTS 9,639,183 B2 *    5/2017  Fleck ................... G06F 3/03545
9,753,590 B2 *    9/2017  Won ...................... G06F 3/0412
(Continued)

FOREIGN PATENT DOCUMENTS

CN    102109923 A    6/2011
CN    102902383 A    1/2013
(Continued)

OTHER PUBLICATIONS

International Search Report dated Jun. 29, 2017, issued in counterpart International Application No. PCT/CN2017/079337 (12 pages).
(Continued)

*Primary Examiner* — Kwang-Su Yang
(74) *Attorney, Agent, or Firm* — Westerman, Hattori, Daniels & Adrian, LLP

(57) ABSTRACT

A touch control method, including receiving a touch input, driving a first common electrode to output a voltage for generating a display, detecting a first signal, determining a position of the touch input based on the detected first signal and a position of a second common electrode detecting the first signal, and detecting a pressure signal to determine an amount of pressure applied by the touch input. The technical
(Continued)

solution also relates to an active stylus for a touch panel, a touch panel, and a touch display apparatus.

14 Claims, 12 Drawing Sheets

(56) References Cited

U.S. PATENT DOCUMENTS

| | | | |
|---|---|---|---|
| 10,198,093 B2* | 2/2019 | Hara | G06F 3/03545 |
| 2011/0155479 A1* | 6/2011 | Oda | G06F 3/03545 |
| | | | 178/18.06 |
| 2013/0249823 A1 | 9/2013 | Ahn et al. | |
| 2014/0285464 A1 | 9/2014 | Mo et al. | |
| 2016/0188007 A1 | 6/2016 | Jung et al. | |
| 2017/0075493 A1* | 3/2017 | Lee | G06F 3/0418 |
| 2017/0123518 A1 | 5/2017 | Ahn et al. | |

FOREIGN PATENT DOCUMENTS

| | | |
|---|---|---|
| CN | 202815747 U | 3/2013 |
| CN | 103149723 A | 6/2013 |
| CN | 103365440 A | 10/2013 |
| CN | 104156088 A | 11/2014 |
| CN | 105718076 A | 6/2016 |
| CN | 105739751 A | 7/2016 |

OTHER PUBLICATIONS

Office Action dated Jun. 17, 2019, issued in counterpart Chinese application No. 201610843299.6 (w/ English machine translation, 38 pages).

* cited by examiner

Upon detection of the trigger signal, active stylus transmits the pressure signal after transmitting the first signal for a first time period, wherein touch panel transmits the trigger signal at a different frequency from the first frequency for the first signal and the second frequency for the pressure signal  S3051

TOUCH CONTROL METHOD FOR TOUCH PANEL, TOUCH PANEL, ACTIVE STYLUS FOR TOUCH PANEL, AND TOUCH DISPLAY APPARATUS INCLUDING TOUCH PANEL

CROSS-REFERENCE TO RELATED APPLICATIONS

This application claims the benefit of the filing date of Chinese Patent Application No. 201610843299.6 filed on Sep. 22, 2016, the disclosure of which is hereby incorporated by reference.

TECHNICAL FIELD

The present disclosure relates to display technology, and in particular, to a touch control method, an active stylus for a touch panel, a touch panel, and a touch display apparatus.

BACKGROUND

With the advent of touch display technology in recent years, touch panels are now applied to wide-ranging uses, and have become an integral part of people's work and lives. Mobile phones, tablet PCs, smart bracelets, and smart watches, to name but a few examples, are all equipped with a touch panel.

A conventional touch panel generally includes a processor coupled to an array of touch electrodes. When a user touches a touch panel, the touch electrodes at the point of contact generate a touch input signal. The processor then determines the position of contact based on the position of the touch electrodes originating the touch input signal.

However, because the conventional touch control method as described above requires dedicated electrodes, that is, the touch electrodes, to determine the position of a touch input, this requirement limits the functionalities and capabilities of the touch panel.

BRIEF SUMMARY

One embodiment of the present disclosure is a touch control method for a touch display apparatus. The touch display apparatus may comprise: a touch panel; and an active stylus. The touch panel may comprise a common electrode array and may be configured to generate a display, determine a touch input position of a touch input by the active stylus, and determine a touch input pressure of the touch input.

The touch control method may comprise: the touch panel detecting the touch input; the touch panel generating the display, the generating of the display comprising driving at least a first common electrode of the common electrode array to output a display voltage; the touch panel determining the touch input position, the determining of the touch input position comprising detecting a first signal transmitted at a first frequency from the active stylus through at least a second common electrode of the common electrode array, and determining the touch input position based on the detected first signal and a position of the at least the second common electrode; and the touch panel determining the touch input pressure, the determining of the touch input pressure comprising detecting a pressure signal transmitted at a second frequency from the active stylus and determining the touch input pressure based on the detected pressure signal.

In at least some embodiments, for a duration of a first time period, the touch panel may alternate between the generating of the display and the determining of the touch input position at least once. After the first time period, the touch panel may transmit a trigger signal at a third frequency to the active stylus, the trigger signal triggering the transmission of the pressure signal from the active stylus to the touch panel. The third frequency may be different from the first frequency and the second frequency.

After the first time period, the touch panel may switch to the detecting of the pressure signal. The first frequency and the second frequency may be different.

In at least some embodiments, the touch panel may determine the touch input position simultaneously as the touch input pressure. During a time period of one frame of images, the touch panel may alternate between the generating of the display and the simultaneous determining of the touch input position and touch input pressure at least once. The first signal may be detectable for a duration of a first time period in the time period of one frame of images, and the pressure signal nay be detectable after the first time period. The first frequency and the second frequency may be different.

The pressure signal may be detectable for a duration of a second time period in the time period of one frame of images. The second time period may be longer than or equal to $t_1+2t_2$, $t_1$ being a time for the generating of the display, and $t_2$ being a transmission cycle of the pressure signal in the second time period.

The transmission cycle of the pressure signal in the second time period may be shorter than half of a time for the determining of the touch input pressure.

In at least some embodiments, during a time period of one frame of images, the touch panel may alternate between the generating of the display and detecting a touch input mode at least once. The detecting of the touch input mode may comprise determining whether the touch input is from a finger touch or the active stylus.

Another embodiment of the present disclosure is a driving method for an active stylus. The driving method may comprise: transmitting a first signal at a first frequency to a touch panel configured to interact with the active stylus, the first signal signaling the touch panel to determine a position of a touch input on the touch panel; and transmitting a pressure signal at a second frequency to the touch panel, the pressure signal signaling the touch panel to determine a pressure of the touch input on the touch panel.

The first signal may be transmitted for a duration of a first time period. After the first time period, the pressure signal is transmitted. The first frequency and the second frequency may be different.

The active stylus may transmit the pressure signal for a second time period. The second time period may be longer than or equal to $t_1+2t_2$, $t_1$ being a time that a display is generated on the touch panel, and $t_2$ being a transmission cycle of the pressure signal in the second time period.

The transmission cycle of the pressure signal in the second time period may be shorter than half of a time for the determining of the touch input pressure.

In at least some embodiments, the driving method may further comprise: detecting a trigger signal transmitted at a third frequency from the touch panel, the trigger signal signaling the active stylus to transmit the pressure signal; and transmitting the pressure signal after a delay between the detecting of the trigger signal and the transmitting of the pressure signal. The third frequency may be different from the first frequency and the second frequency.

Another embodiment of the present disclosure is an active stylus for a touch panel. The active stylus may comprise: a memory; and a processor coupled to the memory.

The processor may be configured to: transmit a first signal at a first frequency to a touch panel configured to interact with the active stylus, the first signal signaling the touch panel to determine a position of a touch input on the touch panel; and transmit a pressure signal at a second frequency to the touch panel, the pressure signal signaling the touch panel to determine a pressure of the touch input on the touch panel.

In at least some embodiments, the active stylus may further comprise a signal receiver configured to receive a trigger signal transmitted from the touch panel. The processor may further be configured to transmit the pressure signal after a delay between the detecting of the trigger signal and the transmitting of the pressure signal.

In at least some embodiments, the processor may be further configured to transmit the first signal for a duration of a first time period, and after the first time period, transmit the pressure signal. The first frequency and the second frequency may be different.

The processor may be configured to transmit the pressure signal for a second time period. The second time period may be longer than or equal to $t_1+t_2$, $t_1$ being a time that a display is generated on the touch panel, and $t_2$ being a transmission cycle of the pressure signal in the second time period.

Another embodiment of the present disclosure is a touch panel. The touch panel may comprise: a common electrode array; a memory; and a processor coupled to the memory.

The processor may be configured to: detect a touch input by an active stylus on the touch panel; generate a display, the generating of the display comprising driving at least a first common electrode of the common electrode array to output a display voltage; determine a position of the touch input, the determining of the touch input position comprising detecting a first signal transmitted at a first frequency from the active stylus through at least a second common electrode of the common electrode array, and determining the touch input position based on the detected first signal and a position of the at least the second common electrode; and determine a pressure of the touch input, the determining of the touch input pressure comprising detecting a pressure signal transmitted at a second frequency from the active stylus and determining the touch input pressure based on the detected pressure signal.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the present disclosure are apparent from the following detailed description taken in conjunction with the accompanying drawings in which:

DETAILED DESCRIPTION

Next, the embodiments of the present disclosure will be described clearly and completely in conjunction with the accompanying drawings, which are described briefly above. The subject matter of the present disclosure is described with specificity to meet statutory requirements. However, the description itself is not intended to limit the scope of this disclosure. Rather, the inventors have contemplated that the claimed subject matter might also be embodied in other ways, to include different steps or elements similar to the ones described in this document, in conjunction with other present or future technologies.

The present inventors worked to address the technological problems associated with conventional touch panels, including the technological problem described above of limited functional capabilities. Embodiments of the present disclosure configure the touch panel to perform display functions, to map a touch input, and to detect pressure of the touch input. By configuring the touch panel to perform image display, position detection, and pressure detection, and to receive the first signal and the pressure signal transmitted through an active stylus, the present disclosure advantageously addresses technological problems associated with conventional touch panels, including the technological limitation of having to rely on dedicated touch electrodes to determine a touch input position. The present disclosure thus makes it possible to design a multi-functional touch panel that is able to not only determine the position of touch input, but can also determine the pressure applied by the touch input.

Figure 1:
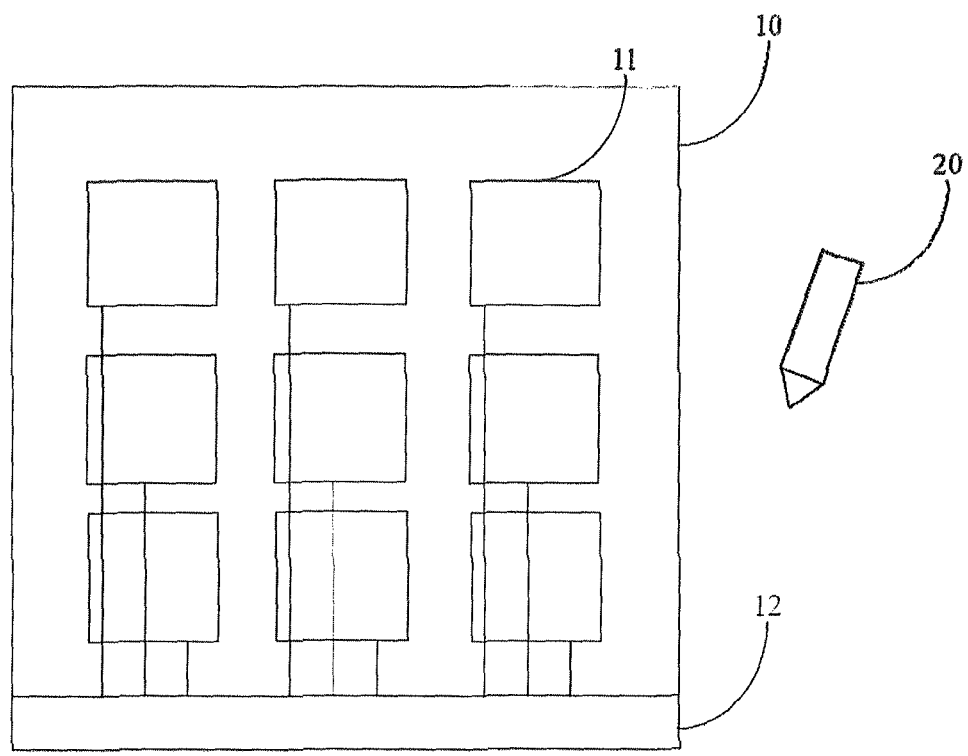
FIG. 1 shows a schematic diagram of a touch display apparatus according to an embodiment of the present disclosure.

FIG. 1 shows a schematic diagram of a touch display apparatus according to an embodiment of the present disclosure. The touch display apparatus comprises a touch panel 10 and an active stylus 20.

The touch panel 10 comprises an array of common electrodes 11 and a control integrated circuit (IC) 12. The integrated circuit 12 may be a touch and display driver integrated (TDDI) circuit. The common electrodes 11 may be configured to function as a touch electrode during the touch control process. The active stylus 20 is designed to move smoothly on the touch panel 10. The active stylus 20 is configured to transmit signals to the touch panel 10. The touch panel 10 is configured to receive the transmitted signals through the common electrodes 11, and is also configured to transmit signals through the common electrodes 11 to the active stylus 20.

Figure 2:
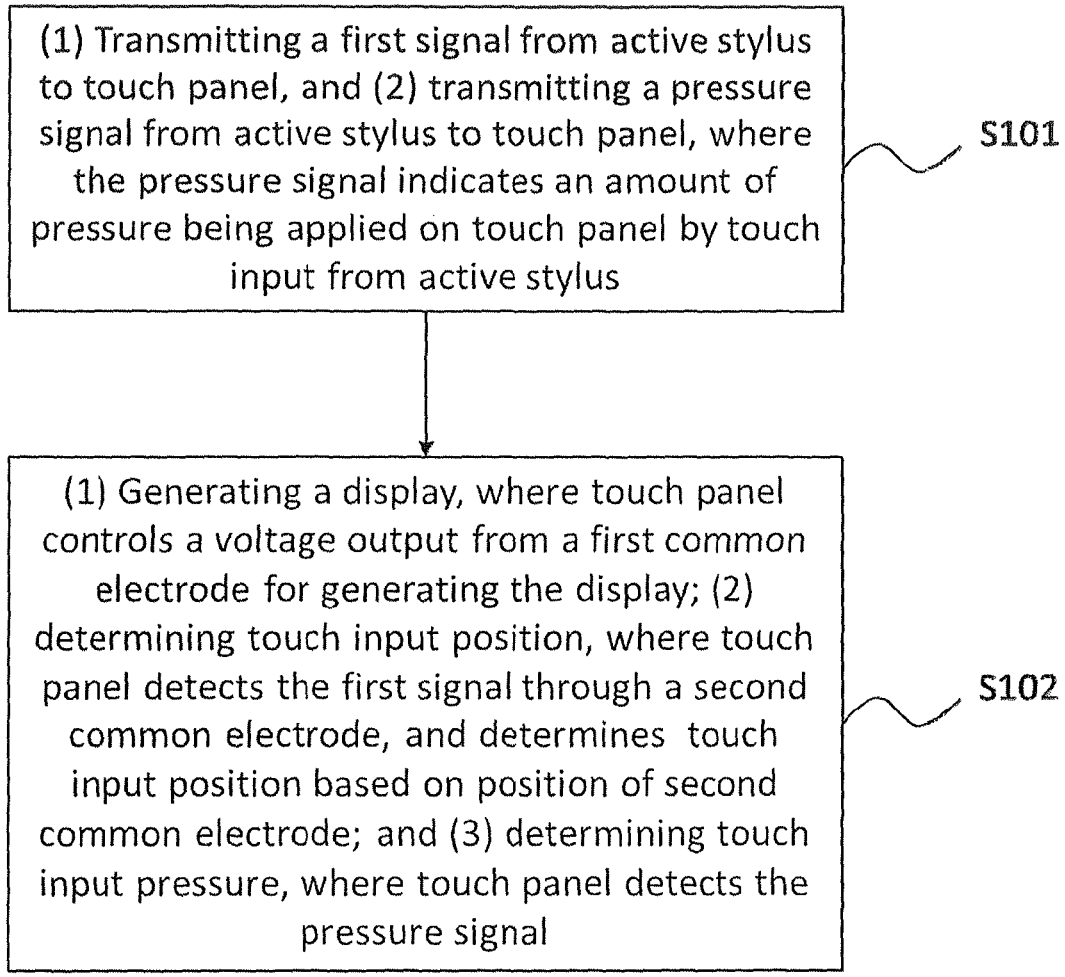
FIG. 2 shows a flow chart of a touch control method according to an embodiment of the present disclosure.

FIG. 2 shows a flow chart of a touch control method according to an embodiment of the present disclosure. For convenience and illustration only, the touch control method is explained using the embodiment of touch display apparatus exemplified in FIG. 1.

In step 101, the active stylus transmits a first signal and a pressure signal to the touch panel. The pressure signal indicates the amount of pressure that the active stylus is applying to the touch panel.

In step 102, the touch panel generates a display, determines the touch input position of the active stylus on the touch panel, and determines the pressure that the active stylus is applying to the touch panel. When generating a display, the touch panel controls a display voltage output from a first common electrode for generating the display. When determining the touch input position, the touch panel detects a first signal through a second common electrode, the first signal having been transmitted from the active stylus. The touch panel then determines the touch input position based on the position of the second common electrode detecting the first signal. When determining the touch input pressure, the touch panel detects the pressure signal, the pressure signal having been transmitted from the active stylus to indicate the amount of pressure that the active stylus is applying to the touch panel.

More generally, the present disclosure makes it possible to devise a touch control method for a touch display apparatus that improves on conventional touch display apparatuses, for example, by addressing such functional limitations of conventional apparatuses such as reliance on dedicated, single-purpose touch electrodes to determine a touch input position. In embodiments of the present disclosure, coordinated actions between the touch panel and the active stylus of the touch display apparatus make it possible to diversify the functions of the touch panel. For example, the touch panel according to the present disclosure is configured to receive touch signals and pressure signals transmitted from the active stylus, so that the touch panel can generate a display, determine the touch input position of the active stylus on the touch panel, and determine the pressure that the active stylus is applying to the touch panel.

Next, the display process will be explained. The display area of the touch panel displays a frame of images. However, the touch panel does not display the entire frame at once on the panel. Rather, the touch panel divides the frame into multiple portions to be displayed on the appropriate portions of the display area of the panel. The different portions of the frame are then displayed sequentially. For example, if the touch panel has 100 rows of pixels, then the touch panel may display the first 25 rows of pixels (the first display period), then switch to determining the touch position (the touch input position determining period). The length of the touch input position determining period may be the same or different from the length of the first display period. Then, the touch panel may switch again to displaying the next 25 rows of pixels (the second display period). In this example, the touch panel will complete the display of the frame of images after four display periods.

Figure 3:
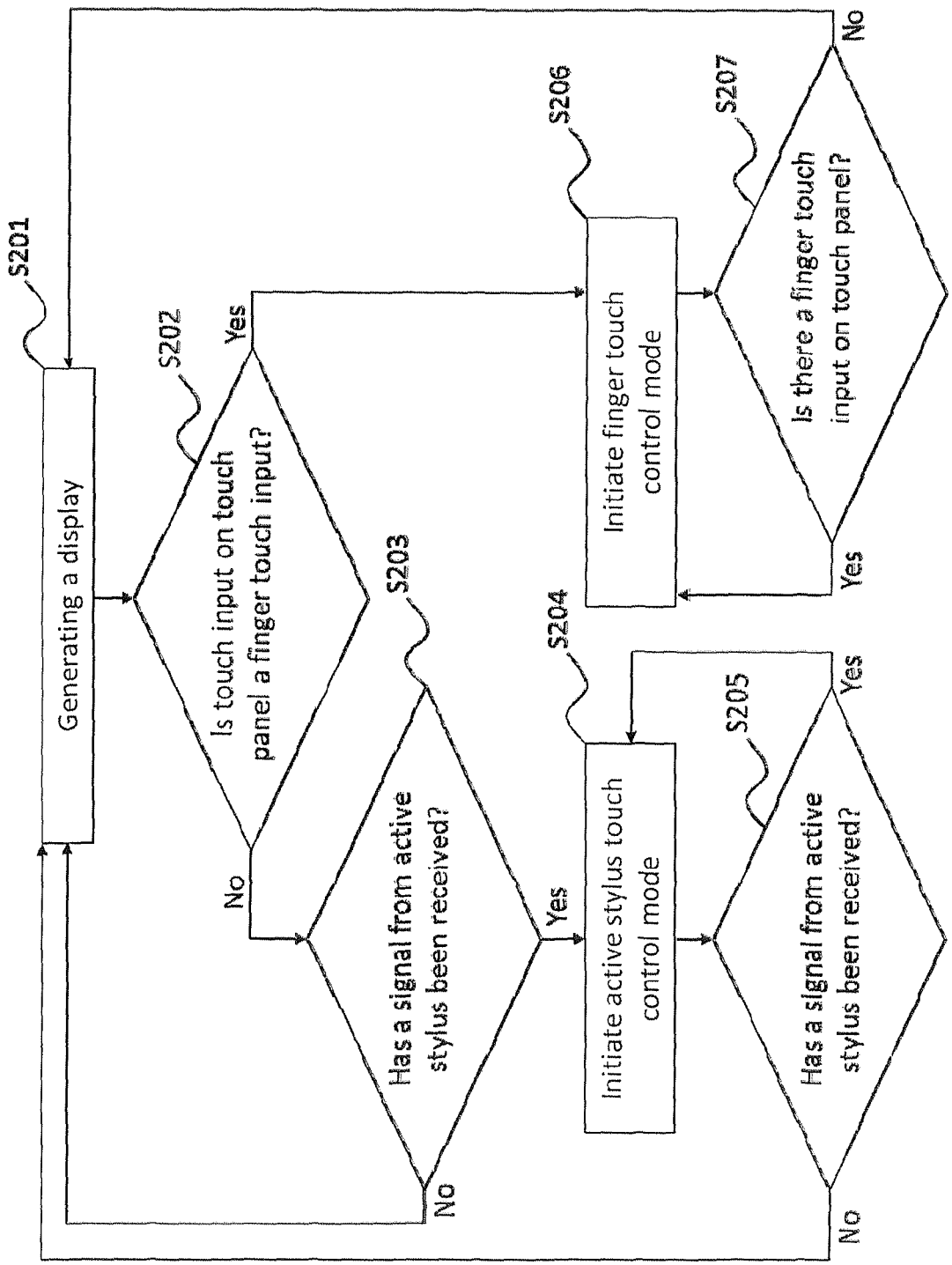
FIG. 3 shows a flow chart of a touch control method according to another embodiment of the present disclosure.

FIG. 3 shows a flow chart of a touch control method according to another embodiment of the present disclosure. For convenience and illustration only, the touch control method is explained using the embodiment of touch display apparatus exemplified in FIG. 1.

As shown in FIG. 3, in step 201, the touch panel generates a display. For example, the touch panel may control the sequence in which portions of a frame of images are displayed (for example, by rows of pixels as described above). The methods by which the touch panel may control the display are not particularly limited, and may include any suitable methods known to a person of ordinary skill in the art.

In step 202, the touch panel detects the touch input mode. The touch panel may detect whether the touch input is a finger touch input. If the touch input is not a finger touch input, then the touch control method proceeds to step 203. If the touch input is a finger touch input, then the touch control method proceeds to step 206. After a display period, the touch panel may pause the display process, and proceed to detect whether there has been a finger touch input on the touch panel. Such detection may be accomplished as follows: the common electrodes are driven to output a touch electrode driving control voltage, and the gate electrodes and the source electrodes are driven to generate signals of the same frequency. Generating signals of the same frequency may help suppress parasitic capacitance between the gate and source electrodes. However, embodiments where the gate electrodes and the source electrodes do not generate signals are also possible. The method by which the touch panel detects a finger touch input is not particularly limited, and may be any suitable method known to a person of ordinary skill in the art.

In step 203, the touch panel detects whether a signal from the active stylus has been received. If yes, the touch control method proceeds to step 204. If no, the touch control method returns to step 201.

Once the touch panel does not detect a finger touch input, then the touch panel may detect whether a signal has been received from the active stylus. During this period, the touch panel may prevent the common electrodes from generating any electrical signals, and maintain the gate electrodes and the source electrodes at a constant voltage level. The touch panel may then detect the receipt of a signal from the active stylus through the common electrodes.

The order in which steps 201, 202, and 203 are performed is not particularly limited. For example, the touch panel may perform step 203 before performing step 202. There are no particular limitations on the order in which the steps are performed.

Further, in the process of displaying a frame of images, the touch panel may alternate between steps 201, 202, and 203. In some embodiments of the present disclosure, steps 201, 202, and 203 may constitute the touch input mode detection.

Figure 4A:
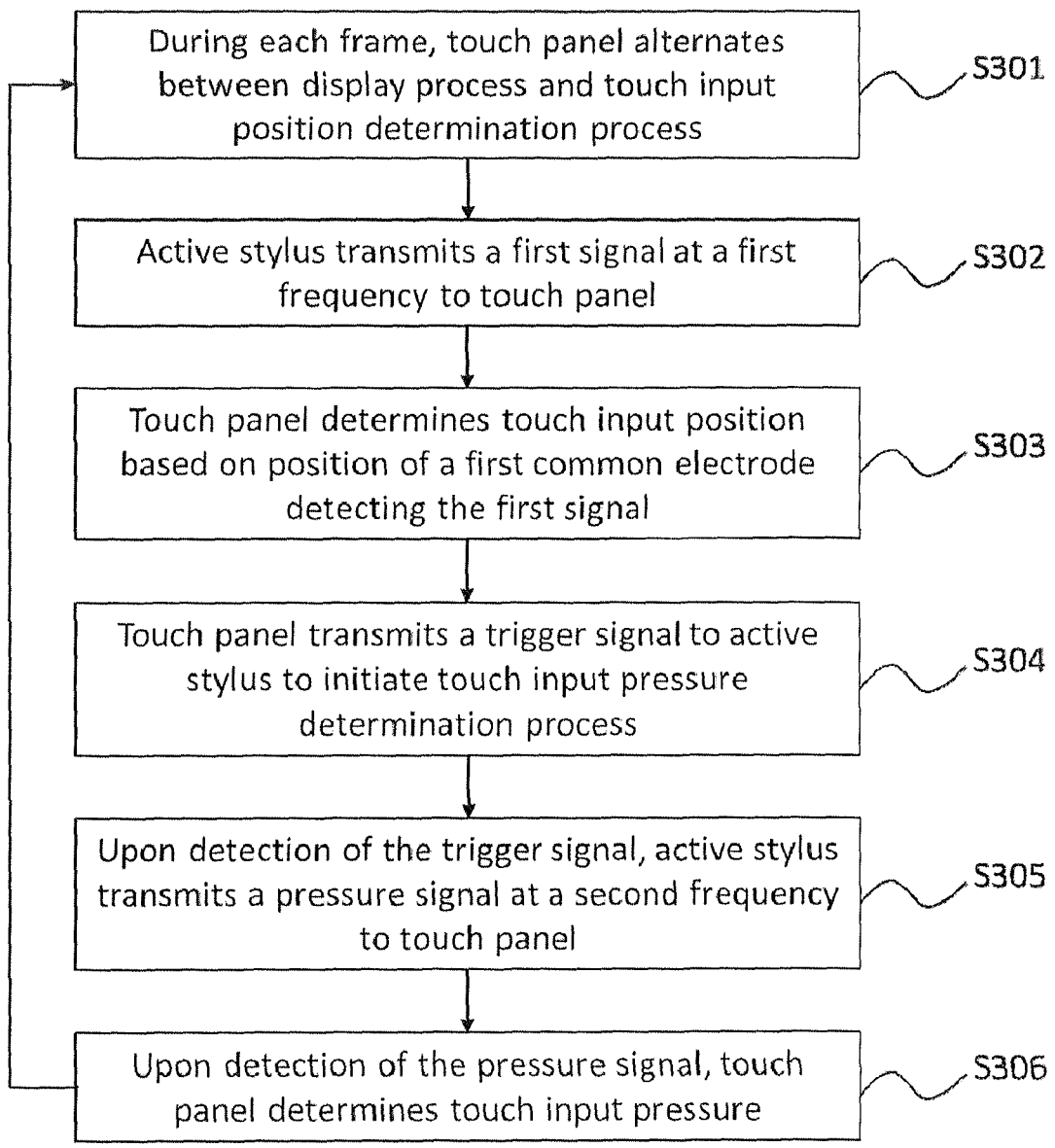
FIG. 4A shows a flow chart of touch control method according to another embodiment of the present disclosure.
Figure 5A:
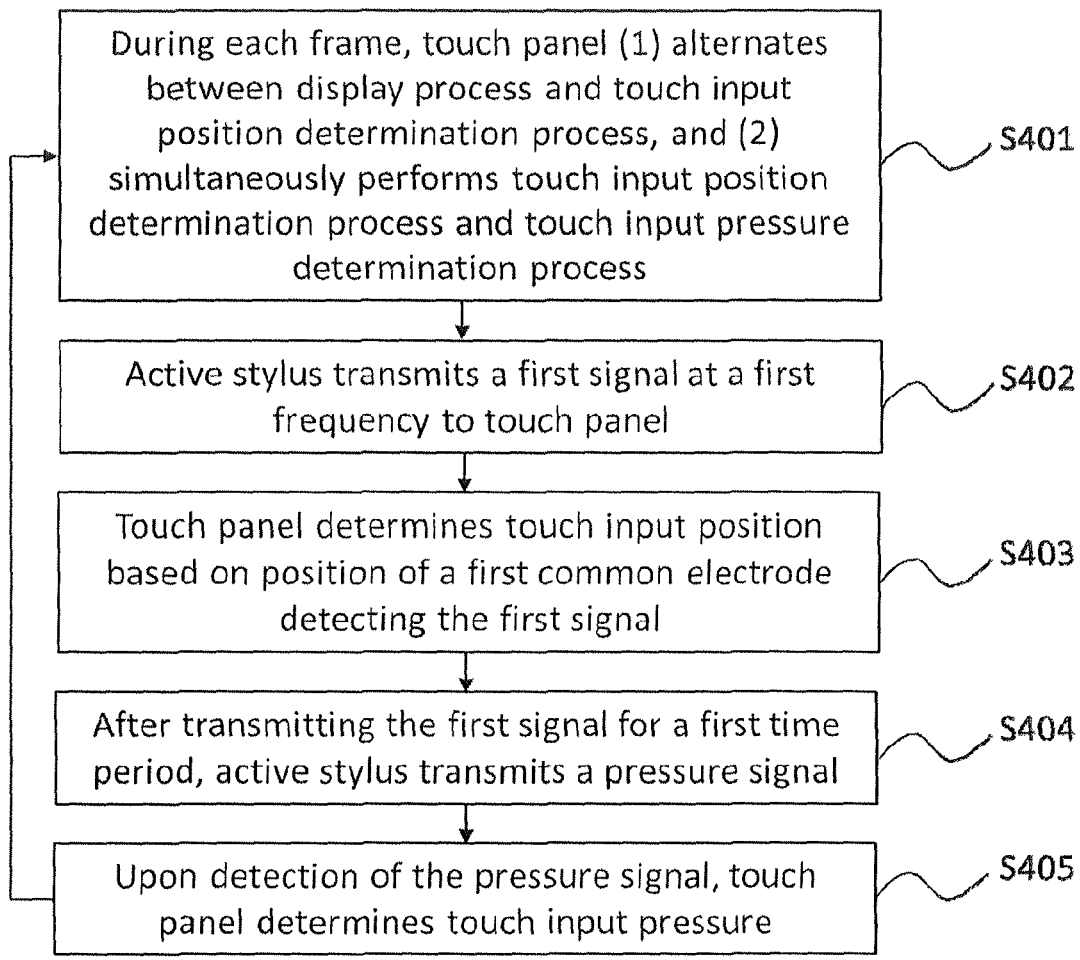
FIG. 5A shows a flow chart of a touch control method according to another embodiment of the present disclosure.

In step 204, the touch panel initiates the active stylus touch control mode, for example, when the touch panel receives a signal from the active stylus. FIGS. 4A and 5A show flow charts of the touch control method.

In step 205, the touch panel detects whether a signal has been received from the active stylus. If yes, then the touch control method returns to step 204. If no, then the touch control method returns to step 201. If the touch panel detects a signal from the active stylus, then the touch panel may continue operating in the active stylus touch control mode. If no signals have been received, which may indicate that the user is no longer operating the active stylus, the touch panel may repeat the touch input mode detection, starting with step 201.

A signal from the active stylus may comprise a first signal and a pressure signal. By "no signals have been received", this can mean that the touch panel has not received any signals from the active stylus after displaying a complete frame of images, after displaying half of the frame of images, or during touch input position determining period. As shown in FIG. 5A, "no signals have been received" can also mean that the touch panel has not received any pressure signals when attempting to determine a touch input pressure.

In step 206, the touch panel initiates the finger touch control mode, for example, when the input on the touch panel is from a finger touch. The operation of the finger touch control mode is not particularly limited, and may include any suitable operational schemes known to a person of ordinary skill in the art.

In step 207, while in the finger touch control mode, the touch panel detects whether there has been a finger touch input. If yes, then the touch control method returns to step 206. If no, then the touch control method returns to step 201. If, while in the finger touch control mode, the touch panel does not detect any finger touch input, but the touch panel receives a signal transmitted from the active stylus, the touch control method may return to step 201.

Steps 201 to 207 describe the process by which a touch panel according to the present disclosure determines the appropriate operating mode.

The touch panel according to an embodiment of the present may comprise a control integrated circuit (IC), and optionally, a touch and display driver integrated (TDDI) circuit. Each of the common electrodes in the touch panel may be coupled to the control IC. The speed at which the touch panel determines a touch position and a touch input pressure may be determined by the control IC, and in particular, by the capacity of the analog front end (AFE) circuit in the control IC. The greater the capacity of the AFE circuit, the greater the number of common electrodes that the touch panel can analyze at once, and the quicker the touch panel can determine the touch input position and the touch input pressure. For example, if the touch panel can analyze half of the common electrodes at one time, and if the touch panel obtains touch input position coordinates at 120 Hz (each frame is 60 Hz, and 120 Hz means that the touch panel may obtain the touch input position coordinates twice in each frame). In some embodiments, in each frame, the touch panel can perform two touch input position determinations and one touch input pressure determinations.

FIG. 4A shows a flow chart of touch control method according to another embodiment of the present disclosure. For convenience and illustration only, the touch control method is explained using the embodiment of touch display apparatus exemplified in FIG. 1.

In step 301, the touch panel alternates, during each frame, between the display process and the touch input position determination process. In determining the touch input position, the touch panel detects the first signal from the active stylus, and determines the position of contact between the active stylus and the touch panel based on the detected first signal and a position of the common electrode detecting the first signal. The specific processes by which the touch input position is determined are not particularly limited, and include any suitable processes known to a person of ordinary skill in the art.

In step 302, the active stylus transmits the first signal to the touch panel. Once powered on, the active stylus can generate the first signal repeatedly and continuously. The first signal may be transmitted from the active stylus to the touch panel during or after contact with the touch panel. In some embodiments, the active stylus may transmit the first signal for the first time only after the first contact with the touch panel. In some embodiments, the active stylus can detect contact with the touch panel via a pressure sensor in the active stylus.

In step 303, the touch panel receives the first signal, and determines the position of contact between the active stylus and the touch panel based on the received first signal. The specific processes by which the touch input position is determined are not particularly limited, and include any suitable processes known to a person of ordinary skill in the art.

In step 304, the touch panel determines the position of the touch input within a first area of the touch panel. The first area within which the touch panel determines the touch input position may be the entire input portion of the touch panel. The input portion may be display portion of the touch panel. The first area may also be only a portion of the input portion. Optionally, if the touch panel is configured to perform touch input pressure determination once every frame, then the first area may be the entire input portion of the touch panel. Optionally, if the touch panel is configured to perform touch input pressure determination twice every frame, then the first area may be a portion (for example, half) of the touch panel's input portion.

After the touch input position determination, the touch panel transmits a trigger signal, and initiates the touch input pressure determination.

The touch panel may transmit multiple trigger signals, so as to help ensure that the active stylus will receive the trigger signal. The frequency of the trigger signal from the touch panel is different from the frequency of the first signal from the active stylus.

In step 305, when the active stylus receives the trigger signal, the active stylus transmits a pressure signal to the touch panel. The frequency of the pressure signal is different from the frequency of the first signal. The pressure signal may be the signal acquired by the pressure sensor in the active stylus during contact with the touch panel. The pressure sensor in the active stylus is configured to measure the pressure that the active stylus is exerting on a touch panel, and then convert the measurement into a pressure signal.

Figure 4B:
FIG. 4B shows a flow chart of the transmission of a pressure signal according to the touch control method illustrated in FIG. 4A.

As shown in FIG. 4B, step 305 may comprise step 3051. In step 3051, after the transmission of the trigger signal, the active stylus transmits the pressure signal after a time period. The frequency of the trigger signal is different from the frequency of the pressure signal. Since the touch panel generally requires some time to transmit the trigger signal, by transmitting the pressure signal on a delay, the active stylus avoids crossing the pressure signal with the trigger signal. Crossed signals may prevent the touch panel from receiving the pressure signal in its entirety. The amount of delay may be set in advance by a user based on the amount of time the touch panel takes to transmit a trigger signal.

In some embodiments, the trigger signal may be a synchronized signal. The active stylus may comprise a synchronization circuit configured to receive synchronized signals. The synchronization circuit may comprise a phase locked loop (PLL) circuit. The PLL circuit can lock the phase and frequency of output signals from the active stylus with those of input signals from the touch panel, in order to synchronize the signals of the active stylus with those of the touch panel (that is, the active stylus can confirm that the trigger signal has been sent and that touch input pressure determination should be initiated).

In step 306, the touch panel receives the pressure signal, and the amount of pressure applied by the touch input on the touch panel is determined based on the pressure signal. The pressure signal may be a coded signal, which is then decoded by the control IC in the touch panel, so as to obtain the pressure information. After the touch panel determines the touch input pressure, the touch control method may restart at step 301.

Figure 4C:
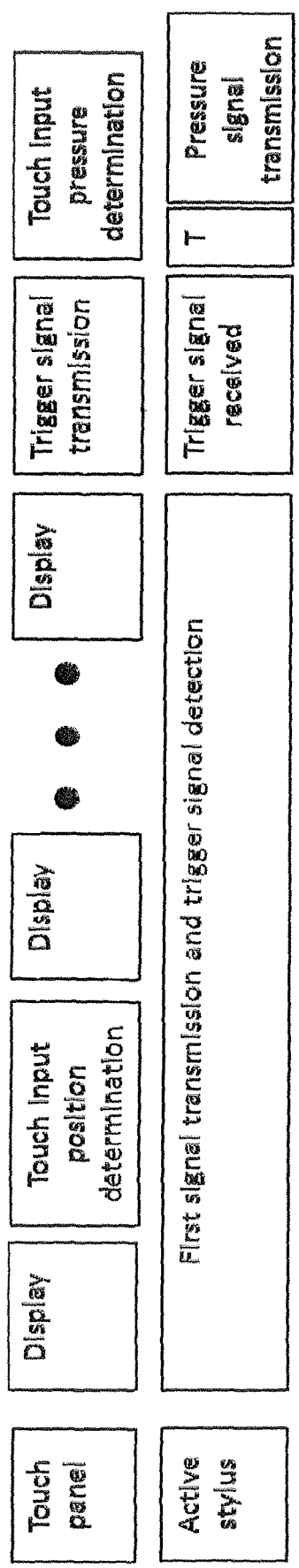
FIG. 4C is an exemplary view illustrating signal timing states of the touch panel and the active stylus according to the touch control method illustrated in FIG. 4A.

FIG. 4C shows a chronology of interactions between the touch panel and the active stylus in the touch control method described above. As shown in FIG. 4C, on a timeline starting from the left: the touch panel alternating between the display process and the touch input position determination process at least once; concurrently, the active stylus transmits a first signal to the touch panel. The active stylus transmits the first signal for the duration of a first time period. In some embodiments, the touch panel may repeat alternating between the display process and the touch input position determination process for an entire duration of this first time period. During the first time period, the first signal is detectable by the touch panel. After the first time period, the touch panel may transmit a trigger signal, signaling the active stylus to transmit a pressure signal. Meanwhile, the active stylus detects whether the touch panel has transmitted the trigger signal. After the active stylus receives the trigger signal, the active stylus transmits the pressure signal after a delay (T), so as to prevent crossing the pressure signal with the trigger signal.

In some embodiments, the touch panel may first initiate the touch input pressure determination process, and the active stylus transmits the first signal to the touch panel. Then, after transmitting the trigger signal to the active stylus, the touch panel initiates the display process and the touch input position determination process, and the active stylus transmits the first signal to the touch panel In some embodiments, the active stylus is equipped with a signal receiver.

FIG. 5A shows a flow chart of a touch control method according to another embodiment of the present disclosure.

In step 401, the touch panel alternates, during each frame, between the display process and the touch input position determination process. The touch input pressure determination process may be performed simultaneously as the touch input position determination process. When determining the touch input position, the touch panel may simultaneously receive another signal from the active stylus. The control IC in the touch panel may be configured to demodulate that signal, so as to decipher whether the signal is a first signal or a pressure signal. Simultaneously determining touch input position and pressure can remove the need for the touch panel to output a trigger signal. This can simplify not only the touch control process, but also the construction of the active stylus, since the active stylus need not be equipped with a signal receiver.

In step 402, the active stylus transmits the first signal to the touch panel. Once powered on, the active stylus can begin transmitting the first signal repeatedly and continuously, and upon contact of the active stylus with the touch panel, the active stylus can transmit the first signal for receipt by the touch panel. In some embodiments, the active stylus may begin transmitting the first signal only upon contact with the touch panel. Through a pressure sensor, the active stylus may be configured to detect pressure between the active stylus and the touch panel, so as to determine whether there has been contact between them.

In step 403, the touch panel determines the position of contact between the active stylus and the touch panel based on the detected first signal and a position of the common electrode detecting the first signal. The specific processes by which the touch input position is determined are not particularly limited, and include any suitable processes known to a person of ordinary skill in the art.

In step 404, the active stylus transmits the pressure signal to the touch panel after transmitting the first signal for a first time period. In some embodiments, the active stylus may begin transmitting the first signal only upon contact with the touch panel. Through a pressure sensor, the active stylus may be configured to detect pressure between the active stylus and the touch panel, so as to determine whether there has been contact between them. Further, the frequency of the pressure signal may be different from the frequency of the first signal, which allows the touch panel to distinguish between the two signals.

Figure 5B:
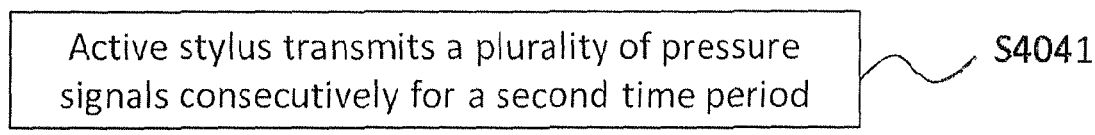
FIG. 5B shows a flow chart of the transmission of a pressure signal according to the touch control method illustrated in FIG. 5A.

As shown in FIG. 5B, step 404 may comprise step 4041. In step 4041, a plurality of pressure signals may be transmitted consecutively for a second time period. The active stylus may not have information about which stage of the touch control method the touch panel is in. Therefore, to ensure that the touch panel receives the pressure signal, the active stylus may transmit a plurality of pressure signals consecutively within a certain time period. In some embodiments of the present disclosure, the second time period is longer than or equal to $t_1+2t_2$, where $t_1$ is a display time for generating the display and $t_2$ is a transmission cycle of the pressure signal in the second time period. The transmission cycle of the pressure signal in the second time period is shorter than half of a time for the determining of the touch input pressure. This helps ensure that the active stylus's transmission of the pressure signals does not overlap completely with the touch panel's display process; otherwise, there is a risk that the touch panel will not receive the pressure signals.

In step 405, the touch panel receives the pressure signal, and the amount of pressure applied by the touch input on the touch panel is determined based on the pressure signal. The pressure signal may be a coded signal. The control IC in the touch panel may be configured to decode the coded pressure signal, so as to obtain the pressure information. After the touch panel determines the touch input pressure, the touch control method may restart at step 401.

Figure 5C:
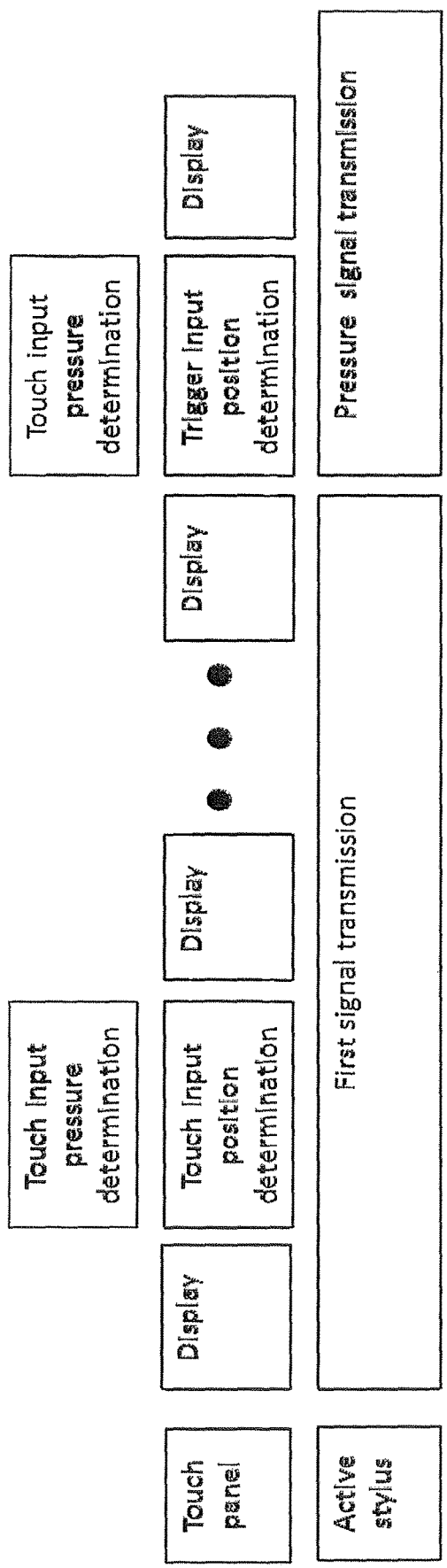
FIG. 5C shows is an exemplary view illustrating signal timing states of the touch panel and the active stylus according to the touch control method illustrated in FIG. 5A.

FIG. 5C illustrates the signal timing states of the touch panel and the active stylus according to the touch control method described above. As shown in FIG. 5C, on a timeline starting from the left, the touch panel alternates between the display process and the touch input position determination process. The touch panel may simultaneously determine the touch input position and the touch input pressure. As the touch panel simultaneously determines the touch input position and pressure, the active stylus concurrently transmits a first signal to the touch panel. The active stylus may transmit the first signal for a first time period. During this first time period, the first signal is detectable by the touch panel. After transmitting the first signal for a first time period, the active stylus then transmits a pressure signal for a second time period. During this second time period, the pressure signal is detectable by the touch panel. A plurality of pressure signals may be transmitted consecutively, in order to ensure that the touch panel receives the pressure signal.

Figure 6A:
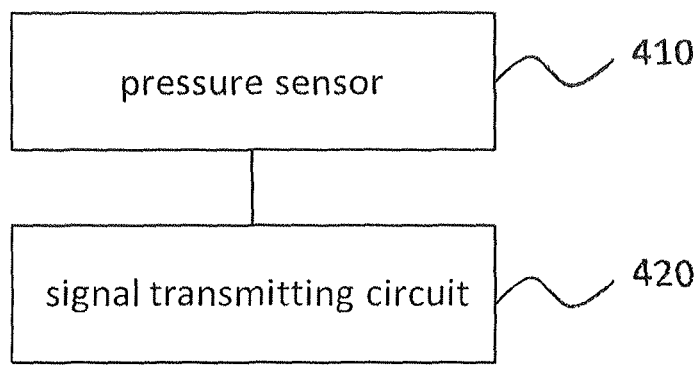
FIG. 6A is a block diagram showing an active stylus according to an embodiment of the present disclosure.

FIG. 6A is a block diagram showing an active stylus according to an embodiment of the present disclosure. The active stylus as exemplified in FIG. 6A may be used in the touch control method according to the present disclosure, including the embodiments exemplified in FIGS. 2, 3, 4A, and 5A. The active stylus comprises: a pressure sensor 410 configured to measure an amount of pressure applied on the touch panel by the active stylus; and a signal transmitting circuit 420 configured to transmit the first signal and pressure signal. The pressure signal indicates the amount of pressure applied on the touch panel by the active stylus. When the touch panel detects the first signal, the touch panel is configured to determine a position of the touch input based on the detected first signal and a position of a common electrode detecting the first signal.

Figure 6B:
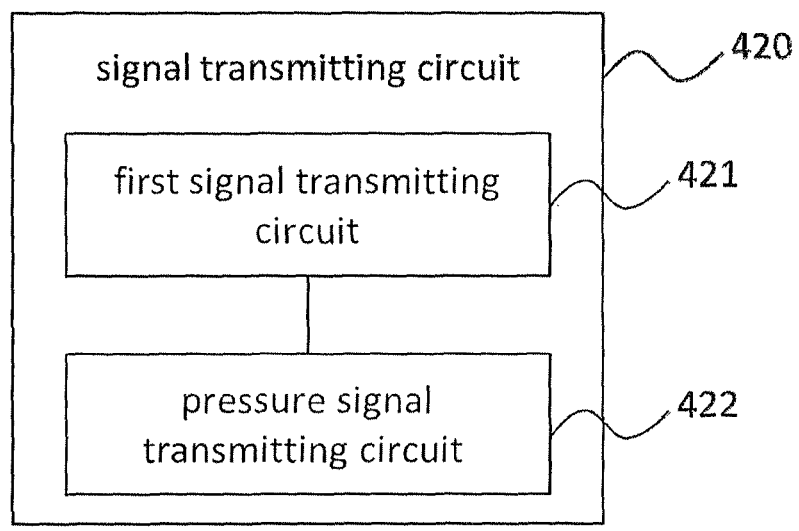
FIG. 6B is a block diagram showing a signal transmitting module for the active stylus illustrated in FIG. 6A.

As shown in FIG. 6B, the signal transmitting circuit 420 may comprise: a first signal transmitting circuit 421 configured to transmit the first signal to the touch panel; and a pressure signal transmitting circuit 422 configured to transmit the pressure signal to the touch panel in response to a trigger signal transmitted from the touch panel. In some embodiments, in response to the trigger signal transmitted from the touch panel, the pressure signal transmitting circuit 422 may be configured to transmit the pressure signal to the touch panel after a first time period, for example, after the active stylus's transmission of the first signal for a first time period. The signaling transmitting circuit 420, the first signal transmitting circuit 421, and the pressure signal transmitting circuit 422 may be incorporated in a single Integrated Chip (IC) or an IC package.

Figure 6C:
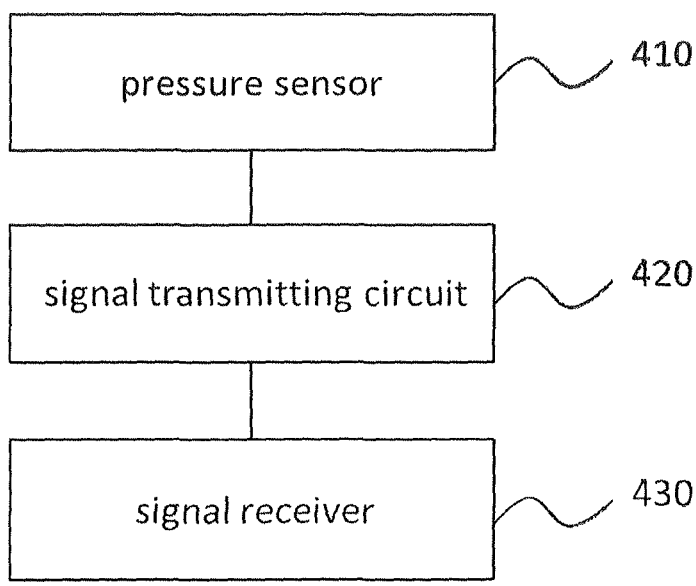
FIG. 6C is a block diagram showing an active stylus according to another embodiment of the present disclosure.

As shown in FIG. 6C, the active stylus may further comprise a signal receiver 430 configured to receive the trigger signal from the touch panel. The signal receiver 430 may comprise a synchronization circuit, including a phase locked loop (PLL) circuit.

Figure 6D:
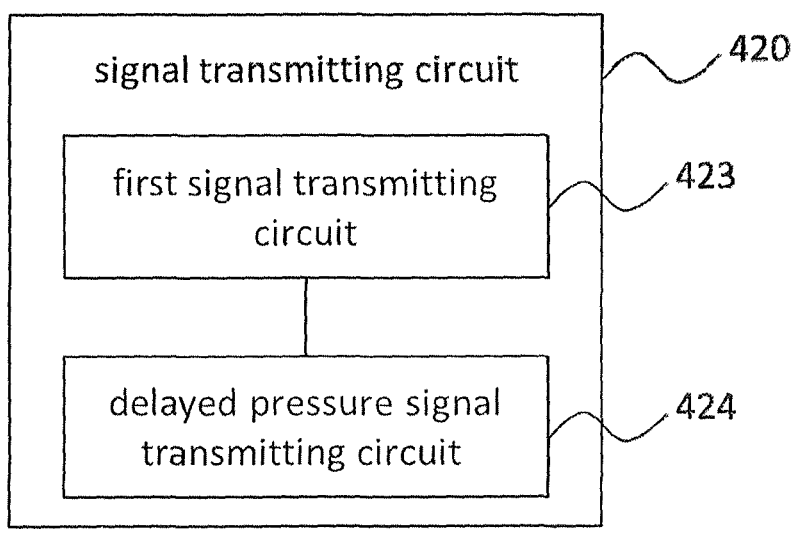
FIG. 6D is a block diagram showing another embodiment of a signal transmitting module for the active stylus illustrated in FIG. 6A.

As shown in FIG. 6D, in another embodiment of the present disclosure, the signal transmitting circuit 420 comprises a first signal transmitting circuit 423 configured to transmit a first signal to the touch panel upon contact; and a delayed pressure signal transmitting circuit 424 configured to transmit the pressure signal after the active stylus's transmission of the first signal for a first time period. The delayed pressure signal transmitting circuit 424 may be configured to transmit a plurality of pressure signals consecutively for a second period of time. In some embodiments of the present disclosure, the second time period is longer than or equal to $t_1+2t_2$, where $t_1$ is a display time for generating the display and $t_2$ is a transmission cycle of the pressure signal in the second time period. The transmission cycle of the pressure signal in the second time period is shorter than half of a time for the determining of the touch input pressure. The signaling transmitting circuit 420, the first signal transmitting circuit 423, and the pressure signal transmitting circuit 424 may be incorporated in a single Integrated Chip (IC) or an IC package.

Figure 7A:
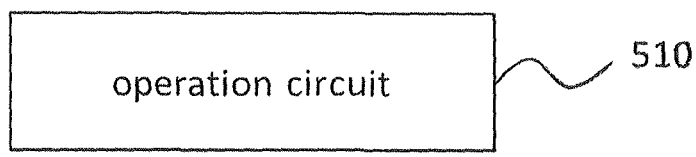
FIG. 7A is a block diagram showing a touch panel according to an embodiment of the present disclosure.

FIG. 7A is a block diagram showing a touch panel according to an embodiment of the present disclosure. The touch panel as exemplified in FIG. 7A may be used in the touch control method according to the present disclosure, including the embodiments exemplified in FIGS. 2, 3, 4A, and 5A.

The touch panel comprises: an operation circuit 510 configured to drive a first common electrode to output a display voltage to generate a display; detect a first signal; determine a position of the touch input based on the detected first signal and a position of a second common electrode detecting the first signal; and detect a pressure signal to determine an amount of pressure applied by the touch input.

Figure 7B:
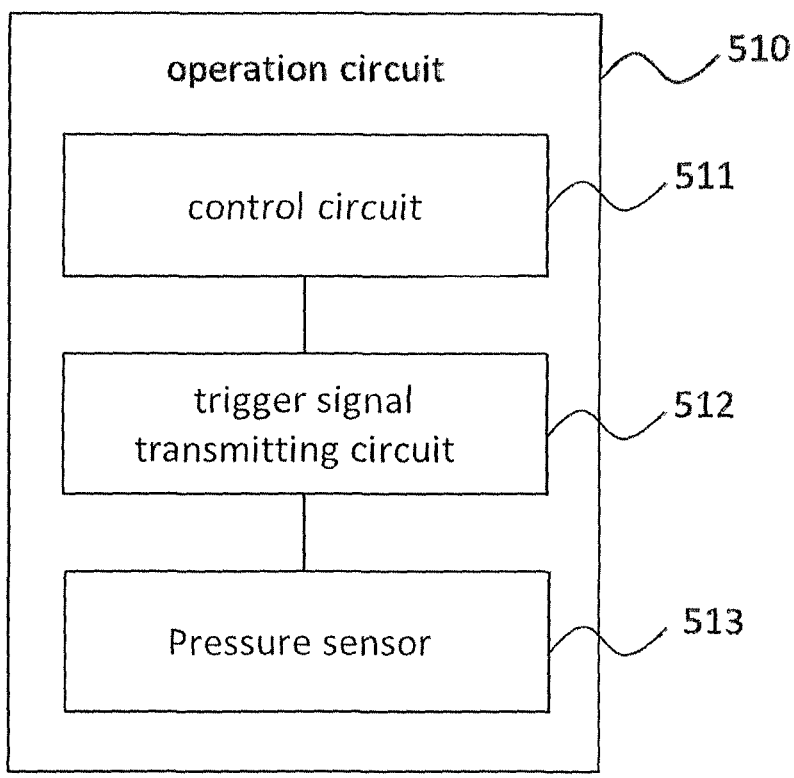
FIG. 7B is a block diagram of an operation module for the touch panel illustrated in FIG. 7A.

In some embodiments of the present disclosure, for example, as shown in FIG. 7B, the operation circuit 510 may comprise a control circuit 511 configured to alternate between the display process and the touch input position determination process, for example, during the active stylus's transmission of the first signal for the first time period. The operation circuit 510 may also comprise a trigger signal transmitting circuit 512 configured to, after the active stylus's transmission of the first signal for the first time period, transmit a trigger signal to the active stylus to trigger a transmission of a pressure signal from the active stylus. The pressure signal, once received by the touch panel, will initiate the touch input pressure determination process. Accordingly, the operation circuit 510 may also comprise a pressure sensor 513 configured to, perform the touch input pressure determination process.

In some embodiments of the present disclosure, the operation circuit 510 may be configured to alternate between the display process and the touch input mode detecting process. The touch input mode detecting process may comprise detecting for a finger touch input or an active stylus touch input. During this touch input mode detecting process, if the touch panel detects a first signal is transmitted from the active stylus, the operation circuit 510 is configured to proceed to generate the display, determine the touch input position, and determine the touch input pressure.

Figure 7C:
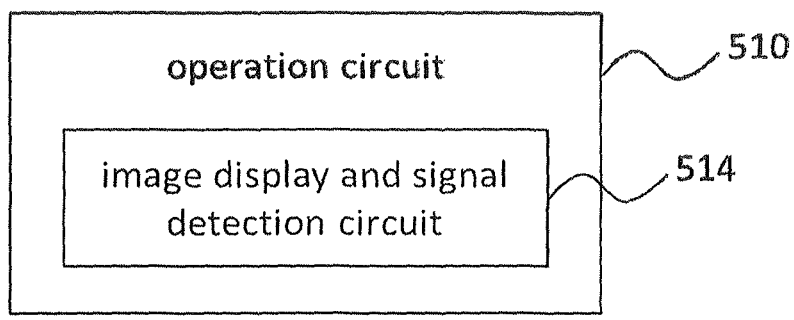
FIG. 7C is a block diagram of another embodiment of operation module for the touch panel illustrated in FIG. 7A.

In some embodiments of the present disclosure, for example, as shown in FIG. 7C, the operation circuit 510 may comprise an image display and signal detection circuit 514 configured to alternate between the display process and the touch input position determination process, and to perform the touch input pressure determination process simultaneously as the touch input position determination process.

The operation circuit 510 may drive, for example, an operating system or an application program so as to control a plurality of hardware or software components connected thereto, and can also perform various data processing and arithmetic operations. The operation circuit 510 may be implemented by, for example, an integrated circuit (for example, a touch and display driver integrated (TDDI) circuit or a System-on-Chip (SoC). The operation circuit 510 may comprise at least some among the components illustrated in FIGS. 7A to 7C. The operation circuit 510 may load and process a command or data received from at least one of the other components of the touch panel (e.g., a non-volatile memory) in a volatile memory, and can store various data in a non-volatile memory.

The present disclosure also provides a touch display apparatus comprising an active stylus as described above and a touch panel as described above.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the present technology has been described in connection with the embodiments of the various figures, it is to be understood that other similar embodiments may be used or modifications and additions may be made to the described embodiment for performing the same function of the present technology without deviating therefrom. Therefore, the present technology should not be limited to any single embodiment, but rather should be construed in breadth and scope in accordance with the appended claims. In addition, all other embodiments obtained by one of ordinary skill in the art based on embodiments described in this document are considered to be within the scope of this disclosure.

What is claimed is:

1. A touch control method for a touch display apparatus comprising a touch panel and an active stylus, wherein the touch panel comprises a common electrode array and is configured to generate a display, determine a touch input position of a touch input by the active stylus, and determine a touch input pressure of the touch input, the touch control method comprising:
   detecting the touch input;
   generating the display, the generating the display comprising driving at least a first common electrode of the common electrode array to output a display voltage;
   determining the touch input position, the determining the touch input position comprising detecting a first signal transmitted at a first frequency from the active stylus through at least a second common electrode of the common electrode array, and determining the touch input position based on the detected first signal and a position of the at least the second common electrode; and
   determining the touch input pressure, the determining the touch input pressure comprising detecting a pressure signal transmitted at a second frequency from the active stylus and determining the touch input pressure based on the detected pressure signal,
   wherein:
   each of the detecting the touch input, the generating the display, the determining the touch input position, and the determining the touch input pressure is performed by the touch panel,
   during a time period of one frame of images, the first signal is detectable for a first time period and the pressure signal is detectable for a second time period, and the second time period is longer than or equal to $t_1+2t_2$, $t_1$ being a time for the generating the display, and $t_2$ being a time for transmitting the pressure signal in the second time period.

2. The touch control method according to claim 1, wherein:
   during the time period of one frame of images, for the first time period, the touch panel alternates between the generating the display and the determining the touch input position at least once;
   after the first time period, the touch panel transmits a trigger signal at a third frequency to the active stylus, the trigger signal triggering the transmission of the pressure signal from the active stylus to the touch panel; and
   the third frequency is different from the first frequency and the second frequency.

3. The touch control method according to claim 2, wherein:
   after the first time period, the touch panel switches to the detecting the pressure signal; and
   the first frequency and the second frequency are different.

4. The touch control method according to claim 1, wherein:
   the touch panel determines the touch input position simultaneously as the touch input pressure,
   during the time period of one frame of images, the touch panel alternates between the generating the display and the simultaneous determining the touch input position and touch input pressure at least once;
   the pressure signal is detectable after the first time period, and
   the first frequency and the second frequency are different.

5. The touch control method according to claim 1, wherein:
   the time for transmitting the pressure signal in the second time period is shorter than half of a time for the determining the touch input pressure.

6. The touch control method according to claim 1, comprising:
   during the time period of one frame of images, the touch panel alternates between the generating the display and detecting a touch input mode at least once,
   wherein the detecting the touch input mode comprises determining whether the touch input is from a finger touch or the active stylus.

7. A driving method for an active stylus, comprising:
   transmitting a first signal at a first frequency to a touch panel configured to interact with the active stylus, the first signal signaling the touch panel to determine a position of a touch input on the touch panel; and
   transmitting a pressure signal at a second frequency to the touch panel, the pressure signal signaling the touch panel to determine a pressure of the touch input on the touch panel,
   wherein during a time period of one frame of images, the first signal is detectable for a first time period and the pressure signal is detectable for a second time period, and the second time period is longer than or equal to $t_1+2t_2$, $t_1$ being a time for generating a display by the touch panel, and $t_2$ being a time for transmitting the pressure signal in the second time period.

8. The driving method according to claim 7, wherein:
   after the first time period, the pressure signal is transmitted; and
   the first frequency and the second frequency are different.

9. The driving method according to claim 7, wherein:
   the time for transmitting the pressure signal in the second time period is shorter than half of a time for the determining the touch input pressure.

10. The driving method according to claim 7, further comprising:
    detecting a trigger signal transmitted at a third frequency from the touch panel, the trigger signal signaling the active stylus to transmit the pressure signal, and
    transmitting the pressure signal after a delay between the detecting the trigger signal and the transmitting the pressure signal,
    wherein the third frequency is different from the first frequency and the second frequency.

11. An active stylus for a touch panel, comprising:
    a memory; and
    a processor coupled to the memory and configured to:
    transmit a first signal at a first frequency to a touch panel configured to interact with the active stylus, the first signal signaling the touch panel to determine a position of a touch input on the touch panel; and
    transmit a pressure signal at a second frequency to the touch panel, the pressure signal signaling the touch panel to determine a pressure of the touch input on the touch panel,
    wherein during a time period of one frame of images, the first signal is detectable for a first time period and the pressure signal is detectable for a second time period, and the second time period is longer than or equal to $t_1+2t_2$, $t_1$ being a time for generating a display by the touch panel, and $t_2$ being a time for transmitting the pressure signal in the second time period.

12. The active stylus according to claim 11, further comprising a signal receiver configured to receive a trigger signal transmitted from the touch panel.

13. The active stylus according to claim 12, wherein the processor is configured to transmit the pressure signal after a delay between the detecting the trigger signal and the transmitting the pressure signal.

14. The active stylus according to claim 11, wherein:
the processor is configured to, after the first time period, transmit the pressure signal; and
the first frequency and the second frequency are different.

* * * * *